United States Patent [19]

Runion

[11] Patent Number: 5,551,460
[45] Date of Patent: Sep. 3, 1996

[54] POULTRY NEST PAD CLEANING METHOD AND APPARATUS

[76] Inventor: Derwood L. Runion, Rte. 2, Box 300, Timberville, Va. 22853

[21] Appl. No.: 374,830

[22] Filed: Jan. 19, 1995

[51] Int. Cl.$^6$ ..................................................... B08B 3/02
[52] U.S. Cl. ................. 134/62; 134/63; 134/72; 134/104.4; 134/125; 134/126; 134/128; 134/131
[58] Field of Search ................................. 134/62, 63, 72, 134/73, 104.4, 125, 126, 128, 129, 131; 68/205 R; 15/77, 102

[56] References Cited

U.S. PATENT DOCUMENTS

| | | | |
|---|---|---|---|
| 2,302,730 | 11/1942 | Woolford | 134/126 X |
| 2,886,838 | 5/1959 | Eygabroad | 68/205 X |
| 3,271,102 | 9/1966 | Morgan | 8/151 |
| 3,304,566 | 2/1967 | Doerschlag | 15/77 |
| 4,118,958 | 10/1978 | Lemon et al. | 68/205 X |
| 4,141,231 | 2/1979 | Kudlich | 68/205 R |
| 4,180,994 | 1/1980 | Lemon et al. | 68/205 X |

*Primary Examiner*—Philip R. Coe
*Attorney, Agent, or Firm*—Ryan M. Fountain

[57] ABSTRACT

A method and apparatus is provided wherein poultry nest pads are moved on a conveyor between a plurality of cleaning stations, involving first bending the pads prior to wetting in order to separate debris and dried manure by cracking and breaking from the projections of the pad and to further expose the internal pad recesses, then spraying the pads with a cleaning fluid at high pressure in a wiping motion across the bent pad, and then spraying with a sheet of cleaning fluid at low pressure across the top and bottom surfaces of the pad while it is in an inverted orientation over a tank or receptacle for receiving the debris, manure and spent cleaning fluid. That receptacle includes an auger for removing the settled manure and debris. A filtering and recirculation system is incorporated with the receptacle for reusing at least a portion of the spent cleaning fluid. The conveyor is arranged to remove individual pads from a stack of dirty pads, support the pads through the cleaning stations and return the pads to a stack of clean pads. The entire apparatus can be mounted on a wheeled stand for transport to the poultry house to be serviced.

9 Claims, 3 Drawing Sheets

POULTRY NEST PAD CLEANING METHOD AND APPARATUS

BACKGROUND AND SUMMARY OF THE INVENTION

The present invention relates generally to methods and apparatus for automatically cleaning a plurality of planar pads of material having a surface of closely spaced projections. More specifically, the present invention relates to methods and apparatus for poultry husbandry operations in cleaning nest pads.

In layer and breeder houses, poultry are typically provided with partially enclosed, individual nests for roosting. Previously, wood shavings, straw and other particulate matter have been placed in the bottom of these nests to simulate the grass of a natural nest. However, such materials have not been sufficiently sanitary and require frequent replacement. To minimize the time and effort in replacement and to maintain more sanitary conditions for the poultry and the eggs, artificial nest pads have been used in place of particulate matter.

Various different types of nest pads are currently in use. In general, these pads formed from plastic material and have a planar configuration with a plurality of closely spaced projections on the top surface, the surface the bird would be in contact with when roosting. These pads are dimensioned so as to fit within the nest enclosure and are also often flexible so as to conform to the configuration of the nest floor. In some pads the projections are blunt or round-end soft, rubber-like cones. In other pads the projections are irregularly oriented, flexible tabs, such as is found in Astroturf®. In yet other pads the projections may be a regular array of flexible tabs arranged in a matrix of tufts. Many pad designs include spacings or holes between some or all of the projections in the top surface to allow some debris, manure and moisture to fall through the pad and out of the nest as well as to permit air circulation into the nest.

In virtually every case, however, after a period of time debris and manure will accumulate on the nest pad in and about the projections. Since that accumulation would create an unsanitary environment for the bird and/or the eggs, it is necessary to periodically remove the nest pads. Unlike with prior nests formed from particulate matter, it is usually desirable to clean and reuse the nest pads. However, given that the typical poultry layer and/or breeder facility would have hundreds or thousands of nest pads and that debris and manure tend to cling to the projections, this cleaning project can be an enormous undertaking in terms of time and effort.

Previously, nest pads have been cleaned manually, such as by hosing down and/or scrubbing each pad. Unfortunately, the relatively small size and weight of the pads required a substantial amount of individual handling. Prior devices have been suggested for automating the cleaning process, such as by placing the pads on a conveyor and spraying the pads with cleaning fluid and/or water from a rotating nozzle. Unfortunately, such devices have not always been able to remove all of the debris and manure, particularly that which is not on the pad top surface, but has been trapped between the projections or migrated through the spacings to adhere to the back surface. Further, the particular nature of poultry manure is such that wetting can cause it to become gummy and glue-like and adhere to the projections.

Accordingly, it is an object of the present invention to provide an improved method and apparatus for cleaning poultry nest pads. Other objects of this invention are to provide for:

a. more complete cleaning of the nest pads with minimal labor, b. efficient utilization of cleaning fluid and energy resources in the cleaning process, c. a portable and compact pad cleaning apparatus which is readily installed at a cleaning site, and d. rapid throughput of pads in the cleaning and sanitizing process.

To accomplish these objectives, an apparatus has been provided wherein nest pads are moved on a conveyor between a plurality of cleaning stations, involving first bending the pads prior to wetting in order to separate debris and dried manure by cracking and breaking from the projections and to further expose the recesses, then spraying the pads with a cleaning fluid at high pressure in a wiping motion across the bent pad, and then spraying with a sheet of cleaning fluid at low pressure across the top and bottom surfaces of the pad while it is in an inverted orientation over a tank or receptacle for receiving the debris, manure and spent cleaning fluid. That receptacle includes an auger or like conveyor for removing settled manure and debris. A filtering and recirculating system is incorporated with the receptacle for reusing at least a portion of the spent cleaning fluid. The conveyor is arranged to remove individual pads from a stack of dirty pads, support the pads through the cleaning stations and return the pads to a stack of clean pads. The entire apparatus can be mounted on a wheeled stand for transport to the poultry house to be serviced.

Other objects, advantages and novel features of the present invention will now become readily apparent to those of skill in the art from the following drawings and detailed description of preferred embodiments.

DESCRIPTION OF PREFERRED EMBODIMENTS

Figure 1:
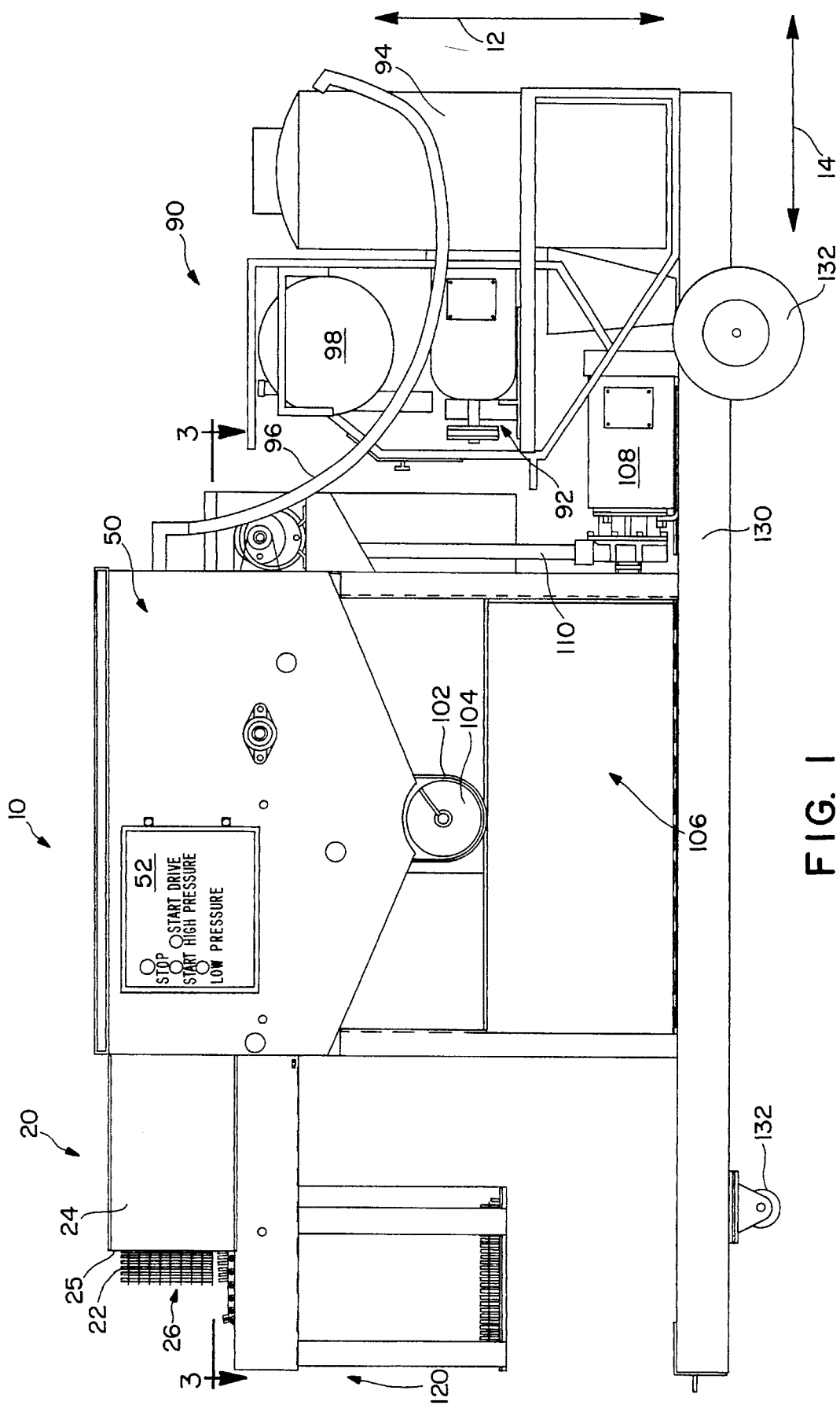
FIG. 1 shows a side view of a portable cleaning apparatus according to the teachings of the present invention.
Figure 2:
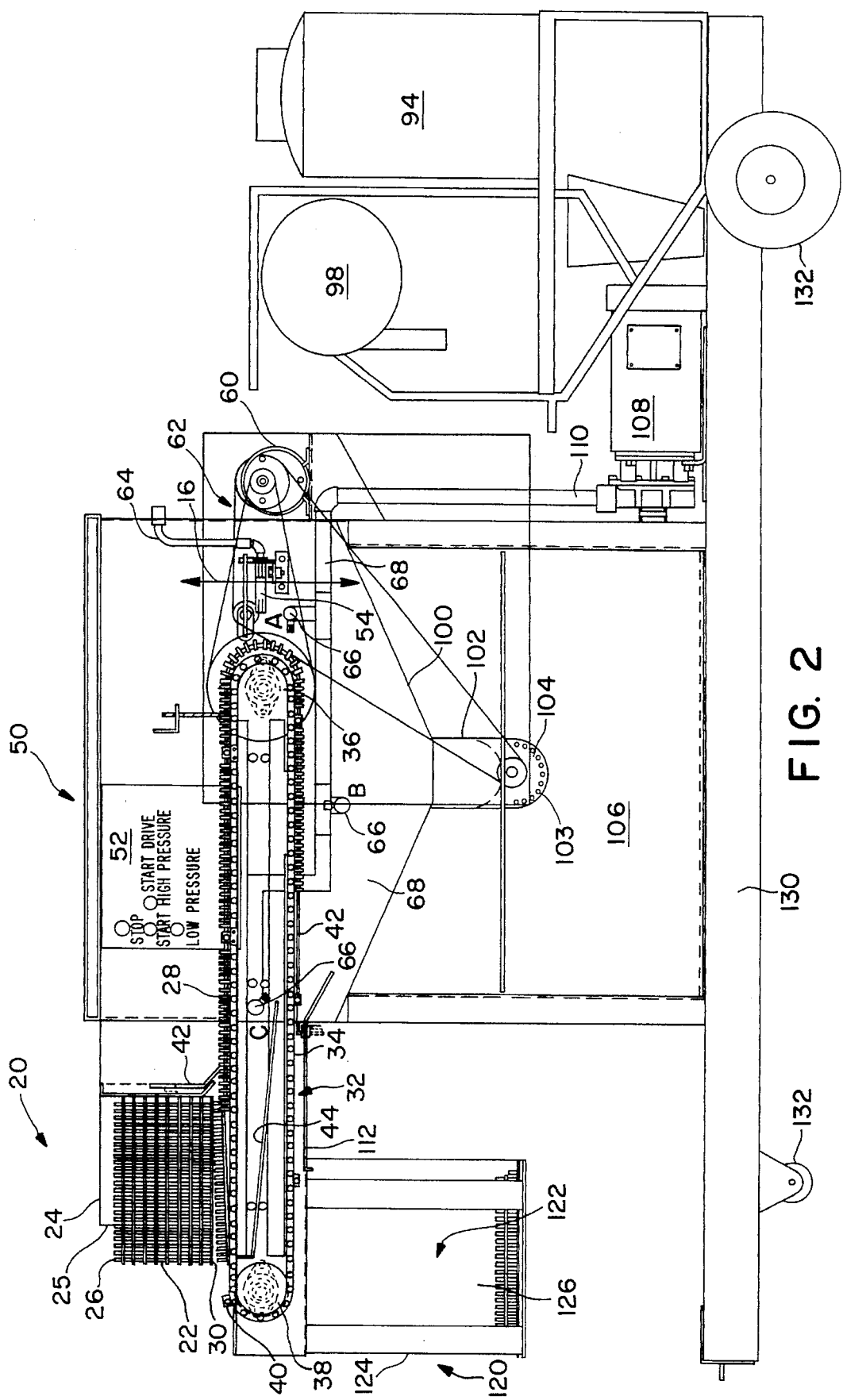
FIG. 2 shows an enlarged, partial cross-sectional side view of the cleaning apparatus of FIG. 1 with portions of the washer cabinet removed to show internal operation and components.
Figure 3:
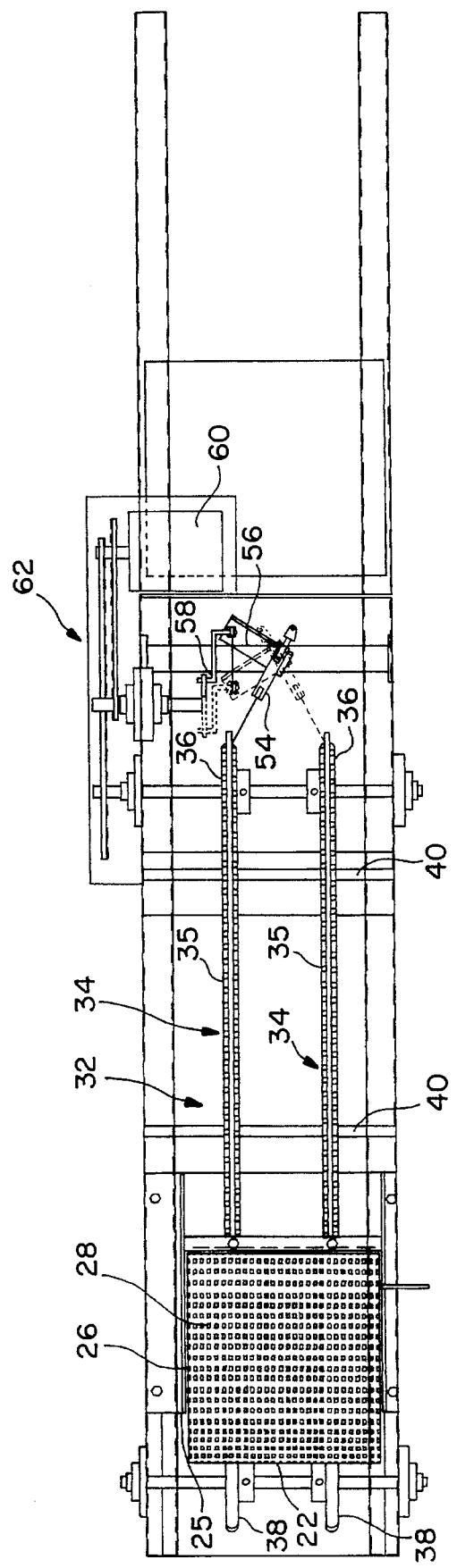
FIG. 3 shows a top view of the conveyor portion of the cleaning apparatus of FIG. 1, taken along line 3—3, with select related components.

FIGS. 1–3 show a preferred embodiment of the cleaning apparatus 10 of the present invention as mounted on a portable, wheeled frame. This apparatus includes an automatic pad loading system 20, a washer cabinet 50, a circulation system 90, and an automatic pad stacking system 120. As an overview, dirty pads are received by loading system 20 and then cleaned at a plurality of cleaning stations within washer cabinet 50 and then provided as clean pads to stacking system 120. Preferably, this apparatus is formed so as to be compact in its dimensions. For example, it has been found that apparatus 10 can be made approximately two feet wide (the depth into the drawing of FIG. 1 ), under six feet high (along axis 12), and eight feet long (along axis 14).

Automatic loading system 20 receives dirty pads 22 in a bin 24 that holds the pads in a vertical stack 26. Typically, bin 24 will be open at its top and front end 25 so as to facilitate loading of the pads. The embodiment shown has been configured to clean a plurality of pads, each having approximately the same dimensions. Each pad 22 includes a top side 28, upon which the poultry are in most frequent contact, and a bottom side 30. Preferably, pads 22 are loaded into bin 24 when dry and with the top side up.

A conveyor 32 is disposed under bin 24 and supports stack 26 at the bottom of the bin. This conveyor includes, for example, a pair of spaced apart endless chains 34 mounted for rotation between drive sprockets 36 and idler sprockets 38. The top surfaces 35 of chains 34 serve as support surfaces to engage bottom sides 30 of each pad. A cross bar, length of angle iron, or like device can be mounted to both of chains 34 traversely of the conveyor width to serve as projections or lugs 40. Such lugs are preferably spaced apart along conveyor 32 by a distance greater than the length of pads 22 and project vertically no more that the height of each pad. In the view of FIGS. 1 and 2, conveyor 32 rotates clockwise. Thus, lugs 40 serve to remove pads 22 one at a time from the bottom of stack 26, as the conveyor rotates, and to transport each pad into washer cabinet 50. In especially preferred embodiments, the speed of travel of conveyor 32 is approximately six feet per minute. At that rate conventional poultry nest pads can be cleaned at the rate of approximately 310 pads per hour.

Guide elements or rods 42 are mounted adjacent conveyor 32 from loading system 20 to stacking system 120. Rods 42 are spaced apart from conveyor 32 over the side regions of the conveyor by, for example, a distance approximately equal to the height of pads 22 such that the pads slide under rods 42 as the pads are moved along by conveyor 32. Thus, rods 42 serve to retain pads 22 to the support surfaces of conveyor 32 throughout the path taken between the pad stacks.

Preferably, pads 22 are loaded into cleaning apparatus 10 when the manure and like debris on the pads is dry. In the process of loading and in the removal of individual pads from stack 26 by conveyor 32, some of that manure and/or debris may become dislodged. Shield 44 is mounted below conveyor 32 and stack 26 to receive such manure and debris and direct it to circulation system 90.

Washer cabinet 50 includes the plurality of cleaning stations for removing manure and debris from pads 22, the operation of which is preferably controlled via electrical control box 52 on the exterior of the cabinet. Conventional safety shut off and other desirable switches and controls can be installed on control box 52 as needed. It has been found to be particularly advantageous to include three types of cleaning stations within washer cabinet 50: a pad bending station, a high pressure wiping spray station and a low pressure sheeting spray station.

The pad bending station is located, for example, at the curve of conveyor 32 about drive sprockets 36. Rods 42 follow conveyor 32 around this curve, and, thus, pads 22 are constrained to follow as well. Preferably, the diameter of drive sprockets 36 is sufficiently small compared to the length of pads 22 that the pads are bent back upon themselves at this curve. In so doing, the spacing between projections on top sides 28 is enlarged sufficiently to force at least some of the dried manure and debris to loosen, break off and/or crack away from some projections and surfaces of the pad. Even if the manure and debris does not immediately fall off of the pads, it has been found to become significantly easier to remove by spraying after this cracking. Bending the pads in this way also exposes for cleaning more of the recessed portions of the pad between the projections, especially where the pad projections are closely spaced. Since the bending occurs prior to wetting of the pads, the manure and debris does not have a tendency to become gummy and adhere excessively to the pads.

The high pressure wiping spray station is preferably located adjacent the pad bending station and includes a high pressure spray nozzle 54. This nozzle is, for example, pivotably mounted about vertical axis 16 so as to be reciprocally movable traversely or laterally across the direction of travel of pads 22 over drive sprockets 36. Pivotal movement of nozzle 54 is controlled by lever arm 56, connected to cam device 58. That cam device is driven in conjunction with conveyor 32 by drive motor 60. Various conventional belt and chain connections 62 can be employed to achieve that result.

It has been found to be particularly advantageous to align nozzle 54 such that it sprays the top surfaces of pads 22 immediately after the pads are bent to crack away manure and debris and to exposed the recessed portions. In that way, the side to side motion of the spray of water across the pads from nozzle 54 creates a wiping motion to, in effect, sweep off loosened manure and debris and penetrate all the way through to the base of the pad projections. Preferably, cleaning fluid is sprayed from nozzle 54 at 1250 to 1400 PSI at a rate of 2.2 gallons per minute. Cleaning fluid is supplied to nozzle 54 via pipe or line 64, connected to the exterior of washing cabinet 50.

The low pressure sheeting spray station is preferably located downstream from the high pressure wiping spray station, begins adjacent the pad bending station and includes low pressure nozzles 66. In the example shown by FIGS. 1–3, nozzles 66 are disposed at three locations A, B and C. At each such location, nozzles 66 are mounted in groups of six separate nozzles linearly aligned across the width of conveyor 32, the end nozzle of each such group being shown in FIG. 2. Thus, the cleaning fluid coming out of those nozzles creates a sheet of spray across pads 22 as they move along conveyor 32 past nozzles 66. Cleaning fluid is, for example, supplied to nozzles 66 via a common pipe or line 68, connected to the exterior of washing cabinet 50.

To improve the cleaning efficiency, nozzles 66 can be specially oriented with respect to pads 22. In FIG. 2, nozzles at location A are arranged near drive sprockets 36 to cause the spray to impact the top surfaces of pads 22 almost tangentially while the pads are still somewhat bent and the interior recesses more exposed. Further downstream at location B, nozzles 66 are arranged to cause the spray to strike the top surfaces of pads 22 nearly perpendicularly or orthogonally while the pads are in their normal, planar configuration. Further yet downstream at location C, nozzles 66 are arranged to cause the spray to strike the bottom surfaces of pads 22 at an acute angle against the direction of travel of the pads along conveyor 32, again while the pads are in their normal planar configuration.

Circulation system 90 supplies and recycles the cleaning fluid. This system includes a high pressure fluid pump 92, a high pressure fluid reservoir or tank 94 connected to pump 92, a high pressure fluid pipe or line 96 connected to line 64. The cleaning fluid is preferably water with a conventional anti-foaming soap or disinfectant mixed therein. Also, it has been found to be advantageous for the cleaning fluid supplied to high pressure nozzle 54 to be heated to approximately 200 degrees Fahrenheit. To achieve that fluid heating, tank 94 can be provided with an internal heater or a coil heater can be mounted along line 96. The initial supply of cleaning fluid and any additional fluid needed in operation can be provided by any conventional pipe connection to high pressure pump 92 or to a supply reservoir 98 disposed in fluid communication with that pump.

It has been found to be particularly advantageous, however, to recycle most of the spent cleaning fluid during operation. To achieve that recycling, circulation system 90 includes funneling shield 100, below washer cabinet 50, to receive manure, debris and spent cleaning fluid washed off of pads 22. This shield is formed, for example, from a screen or filtering layer which permits excess cleaning fluid to pass through the shield, but retains manure and debris. Shield 100 is preferably configured as a funnel to direct such manure and debris toward a lower central region 102 containing an auger or like conveyor 104 for removing accumulated manure and debris from apparatus 10. To increase the rate and/or volume of fluid that can be filtered through the screen of shield 100, the funnel configuration can include a series of downward steps toward region 102. Also, to decrease the amount of cleaning fluid discarded with the manure by auger 104, the walls of region 102 can also be formed from a screen or filtering material and a plurality of holes 103 can be disposed in the radially inner portions of the blades of auger 104. In this way it has been found that the volume of non-recyclable cleaning fluid can limited to at least approximately 2.1 gallons per minute.

Recirculating water tank 106 is disposed below shield 100 to receive the portion of the spent cleaning fluid that can be reused, although initially the fluid in this tank can be clean and unused. That tank is connected to recirculating pump 108 which provides cleaning fluid via pipe or line 110 to line 68 and low pressure nozzles 66. In preferred embodiments, this recycled cleaning fluid is provided to nozzles 66 at approximately 25 PSI.

Since pads 22 travel past locations A, B and C in an inverted or upside down position, manure, debris and cleaning fluid tends to fall of the top surfaces of the pads toward shield 100. As a result, pads 22 tend to "drip dry" during that length of conveyor 32 in the reverse of the way dirt, debris, etc. tends to accumulate on the pads. As the cleaned pads exit washing cabinet 50, rods 42 terminate and the pads are no longer closely retained to the support surfaces of conveyor 32. Instead, pads 22 fall onto plate 112, closely spaced from that conveyor, and are dragged forward by lugs 40 toward pad stacking system 120.

Stacking system 120 reorients the pads to the upright position and stacks the pads for easy removal and reinstallation in the nests. This system includes bin 122, having an open front end 124 from which the pads can be removed. Bin 122 is, for example, disposed with respect to the end of plate 112 such that the leading edge of the pads drops down into bin 122 as the conveyor moves the pads forward. Continued movement of the pads forward causes the pads to flip over inside the bin such that the top surfaces of the pads are again upright and each new pad lands upon the top of the stack. Thus, the pads can be returned to a clean stack in the same order and orientation as taken from the dirty stack. Open sides 126 of bin 122 allow the drying process to continue once the pads are stacked.

Apparatus 10 can be made sufficiently compact so as to be portable by mounting on frame 130. Wheels 132 are disposed on frame 130 to facilitate movement from one poultry house to another.

Although the present invention has been described above in detail with respect to preferred embodiments, the same is by way of illustration and example only, and is not to be taken as a limitation of the full scope of the present invention. Those of skill in the art will now realize that various modifications and refinements of the present invention to particular situations can be made without departing from the scope of the invention. Accordingly, the spirit and scope of the present invention are limited only by the terms of the claims below.

What I claim is:

1. An apparatus for cleaning poultry nest pads, comprising:

first means for supporting said nest pads, second means for applying cleaning fluid to said nest pads while said nest pads are supported by said first means, third means for bending each of said nest pads so as to increase exposure of recessed portions of said nest pads to said cleaning fluid, said second means including a plurality of spraying devices for applying said cleaning fluid to said nest pads, and said first means including a conveyor system with receptacles for receiving in stacked relation nest pads to be cleaned and thereafter providing cleaned nest pads in stacked relation.

2. The apparatus according to claim 1 wherein said conveyor system includes fourth means for retaining said nest pads in an inverted orientation to facilitate cleaning and drying of said nest pads, and said apparatus includes fifth means for receiving waste and spent cleaning fluid from said nest pads and separating a portion of said cleaning fluid therefrom to permit reuse of said cleaning fluid.

3. An apparatus for cleaning poultry nest pads of manure and debris by moving those pads through a plurality of cleaning stations, comprising:

a conveyor means for supporting said nest pads thereon and moving said nest pads between said cleaning stations, a first cleaning station wherein said nest pads are each bent so as to separate said manure and debris from nest pad surfaces, a second cleaning station wherein a first surface of said bent nest pads is sprayed with a cleaning fluid at a first fluid pressure, a third cleaning station wherein said nest pads are restored to their unbent configuration and said first surface of those nest pads is sprayed with a cleaning fluid at a second fluid pressure, and a fourth cleaning station wherein a second surface of said nest pads, opposing said first surface, is sprayed with a cleaning fluid.

4. The apparatus according to claim 3 wherein said second cleaning station includes means for spraying said cleaning fluid in a spray path traversing the direction of travel of said nest pads along said conveyor means.

5. The apparatus according to claim 3 wherein said conveyor means includes a support surface upon which said nest pads are mounted and said conveyor means forms a curved path at said second cleaning station, that second cleaning station including guide elements adjacent and spaced apart from said support surface at said curved path so as to retain said nest pads on said support surface as said nest pads move along the curved path at said second cleaning station.

6. The apparatus according to claim 3 wherein said third cleaning station includes means for retaining said nest pads in an inverted orientation so as to permit manure and debris thereon to fall off incident to spraying with a cleaning fluid, and said third cleaning station includes a receptacle for receiving that manure and debris with means for separating reusable cleaning fluid therefrom.

7. An apparatus for cleaning generally planar pads, each pad having top and bottom surfaces, via a plurality of cleaning stations, comprising:

a first receptacle for receiving dirty pads and retaining them in a first vertical stack, a conveyor adjacent the lower portion of said first receptacle, said conveyor including projections thereon for engaging individual pads and removing them from said first stack, said conveyor having a support surface movable along a circuitous path between said plurality of cleaning stations, guide means adjacent and closely spaced from said conveyor for retaining said pads on said support surface at said each of cleaning stations, a first cleaning station wherein said conveyor forms a curve so as to bend said pads to separate debris from portions of said pads and to increase exposure of recessed portions of said pads, said first cleaning station including first spraying means for applying cleaning fluid at a first pressure across the bent portion of said pads and second spraying means for applying cleaning fluid to said pads at a second pressure, said first pressure being greater than said second pressure, a second and a third cleaning station whereat said pads are retained in an inverted orientation by said guide means and said conveyor, said second cleaning station including third spraying means for applying cleaning fluid to the top surfaces of said pads, said third cleaning station including fourth spraying means for applying cleaning fluid to the bottom surfaces of said pads, a fluid receptacle disposed below said cleaning stations for receiving fluid and debris runoff from said pads, including means for removing accumulated debris therefrom and for recirculating reusable cleaning fluid back to at least some of said cleaning stations, a second receptacle for receiving cleaned pads and retaining them in a second vertical stack.

8. The apparatus according to claim 7 wherein said first spraying means includes a single reciprocating nozzle which sprays cleaning fluid transversely to the direction of travel of said pads.

9. The apparatus according to claim 3 wherein said second spraying means includes a plurality of nozzles disposed in substantially linear orientation to cause cleaning fluid to intersect said pads at an acute angle to the top surfaces thereof, said third spraying means includes a plurality of nozzles disposed in substantially linear orientation to cause cleaning fluid to intersect said pads at an angle generally orthogonal to the top surfaces thereof, and said fourth spraying means includes a plurality of nozzles disposed in substantially linear orientation to cause cleaning fluid to intersect said pads at an angle acute to the bottom surfaces thereof.

* * * * *